Figure 5:
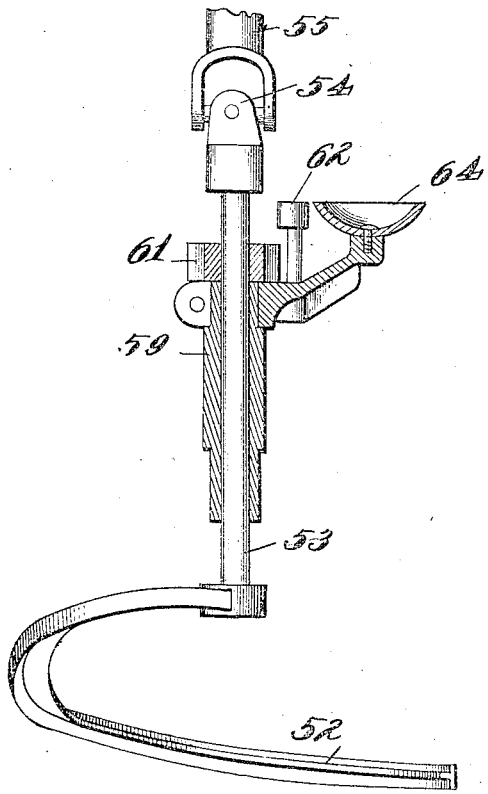

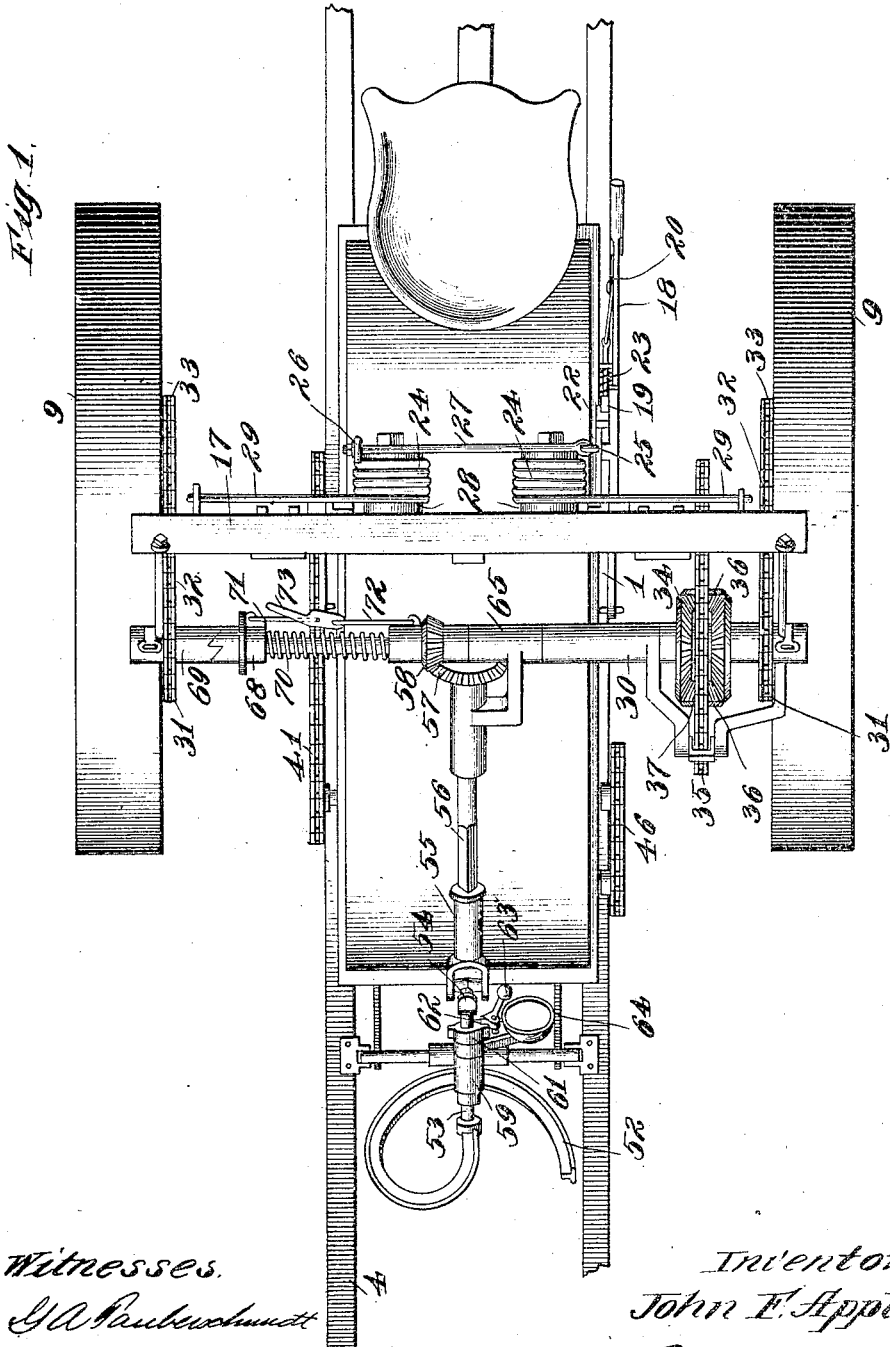

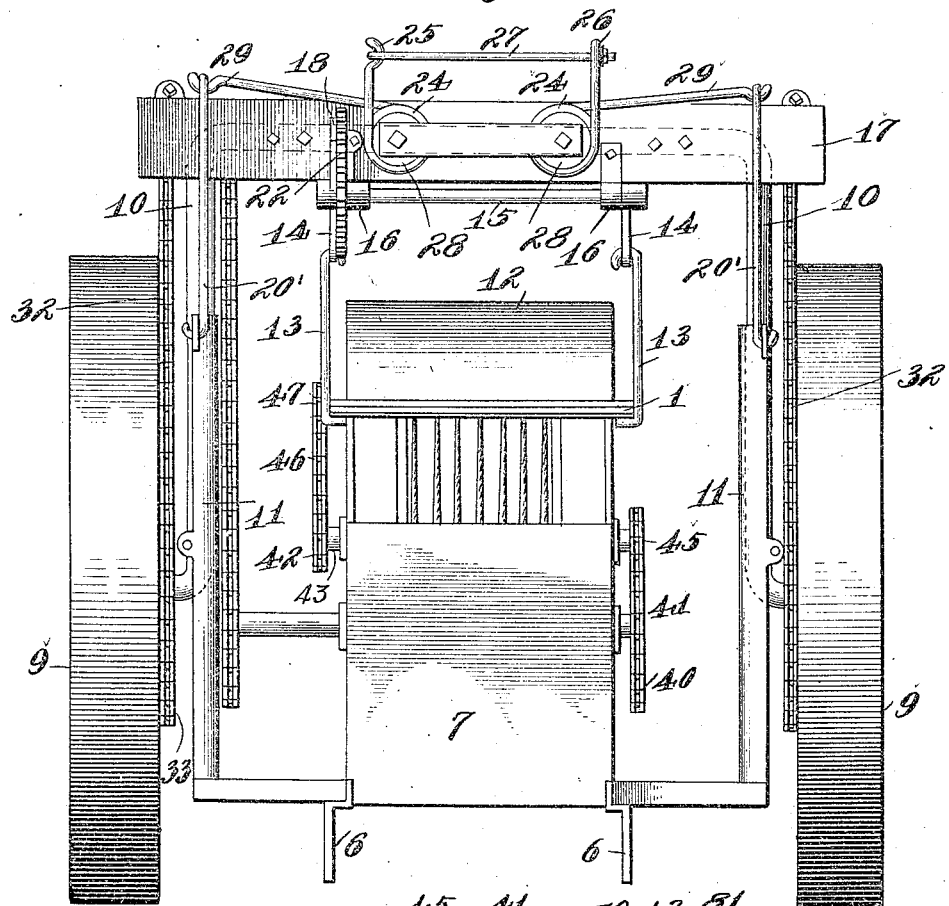
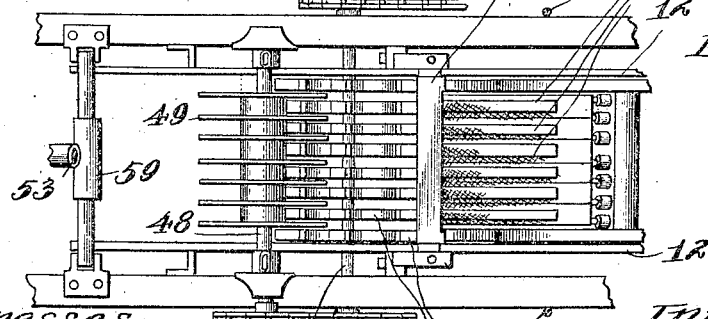

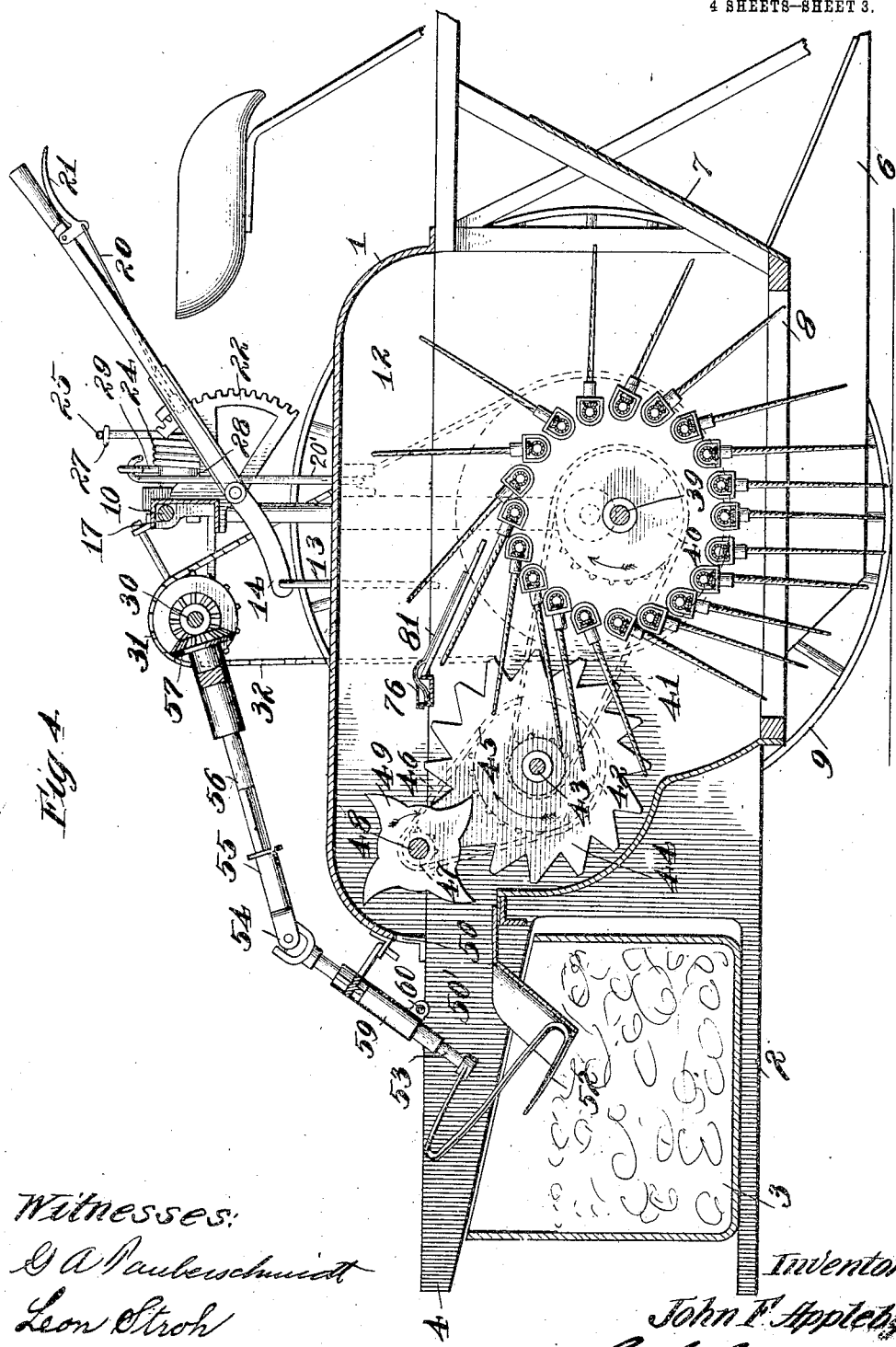

J. F. APPLEBY.
COTTON HARVESTING MACHINE.
APPLICATION FILED APR. 13, 1906.

1,067,576.

Patented July 15, 1913.

4 SHEETS—SHEET 4.

Witnesses:
G. A. Naubenschmidt
Leon Stroh

Inventor
John F. Appleby
By G. L. Cragg
Atty

UNITED STATES PATENT OFFICE.

JOHN F. APPLEBY, OF CHICAGO, ILLINOIS, ASSIGNOR TO DIXIE COTTON PICKER CO., OF REDFIELD, SOUTH DAKOTA, A CORPORATION OF SOUTH DAKOTA.

COTTON-HARVESTING MACHINE.

1,067,576.    Specification of Letters Patent.    Patented July 15, 1913.

Original application filed January 8, 1906, Serial No. 295,100. Divided and this application filed April 13, 1906. Serial No. 311,591.

*To all whom it may concern:*

Be it known that I, JOHN F. APPLEBY, a citizen of the United States, residing at Chicago, in the county of Cook and State of Illinois, have invented a certain new and useful Improvement in Cotton-Harvesting Machines, being a division of my application Serial No. 295,100, filed January 8, 1906, Patent No. 828,264, Aug. 7, 1906, of which the following is a full, clear, concise, and exact description, reference being had to the accompanying drawings, forming a part of this specification.

My invention relates to cotton picking or harvesting machines, the present application being a division of my copending application Serial No. 295,100, filed Jan. 8, 1906, Patent No. 828,264, Aug. 7, 1906.

One feature of my invention resides in providing a packing device operated by mechanism of the harvester, that is operated by power secured from the wheels or running gear, which packing mechanism serves to compress the cotton into a smaller space than it naturally tends to occupy, so that the receptacle for receiving the cotton may contain more cotton than was hitherto possible, without the addition of a special engine for compressing the cotton.

While the preferred form of packing device that I employ is operated by the mechanism of the harvester, the packing device is of such a nature that I do not wish to be limited in all embodiments of the invention to this method of effecting its operation.

In the embodiment of the invention herein set forth, the cotton is cast directly into the receptacle, such as a basket, without the aid of a conveyer, but I do not wish to be limited to this arrangement in all embodiments of the invention. Where separable receptacles, such as baskets, are employed for receiving the cotton, the packing device is adapted to permit of the removal and substitution of the baskets, and in order that the operator of the machine may know when a basket has become sufficiently loaded with cotton, an alarm device, operated only when the cotton has been accumulated to a predetermined extent, is employed, so that notice is given when the filled cotton receptacle may be removed and an empty receptacle substituted therefor.

The packing device constructed in accordance with the preferred embodiment of the invention includes a spiral, desirably of more than one turn, say a turn and a quarter, which spiral is rotated so that it may act as a screw to force the cotton downward as it is received, and as the density and quantity of the cotton increases, a bodily movement of the spiral is permitted, as the shaft upon which the spiral is mounted and which rotates the spiral has desirably a flexible connection with a driving element. When this spiral has been elevated to a predetermined limit, the shaft or some other portion of the packing device moving with the spiral, effects the operation of the alarm, which alarm is desirably in the form of a single stroke bell.

Another feature of my invention resides in the provision of an improved clutching device whereby the packing device and the balance of the mechanism driven by the wheels of the machine are removed from driving connection with the wheels, and as the packing device is driven by gearing or a driving element that is not in tandem with the other driving and driven elements of the machine but is rather driven by bevel gearing, I employ a lever and spring mechanism, which, in one condition of use, permits the simultaneous association of the packing mechanism and the balance of the driven mechanism with the driving mechanism of the machine, and which, in another condition of use, effects the disconnection of the packing mechanism and the driven mechanism of the machine from the driving mechanism and at different points.

In the preferred embodiment of the invention, the clutching mechanism includes a bevel gear that is splined upon a driving shaft and provided for engagement with a companion bevel gear that operates the packing spiral and a clutch collar also splined upon said driving shaft, a spring being interposed between the first aforesaid bevel gear and the clutch collar to force the same apart and permit the engagement thereof with their companions, and a manually operated handle in connection with the first aforesaid bevel gear and the splined collar, which when manipulated in one direction, will force the movement of said collar and the said first bevel gear toward each other, to break their driving connections, and which handle when moved in the reverse direction, will permit the spring to spread the said bevel gear and clutch collar apart to permit the same to effect driving connection.

I will explain my invention more fully by reference to the accompanying drawings, illustrating one of the embodiments thereof, the embodiment illustrated being that which is preferred.

Figure 7:
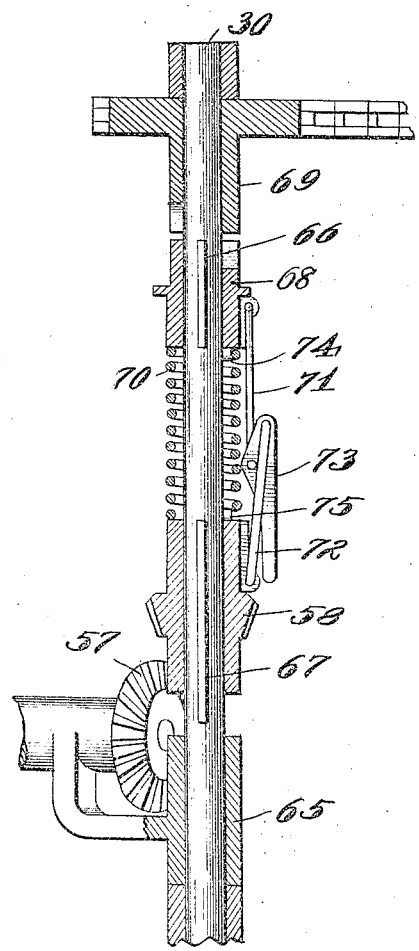
Figure 6:
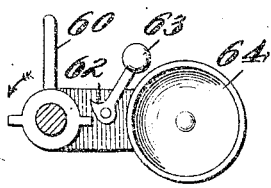

In the drawings—Figure 1 is a plan view illustrating so much of the mechanism as is necessary to an understanding of the invention. Fig. 2 is a view from the front of part of the mechanism entering into the machine. Fig. 3 is a view in plan of a part of the mechanism. Fig. 4 is a longitudinal section in elevation illustrating certain parts of the machine. Fig. 5 is a view partially in section illustrating the packing mechanism. Fig. 6 is a detail view of the alarm mechanism. Fig. 7 is a view illustrating the clutching mechanism.

Like parts are indicated by similar characters of reference throughout the different figures.

The picking, stripping and cleaning mechanism hereinafter to be particularly specified, is mounted within a casing or housing 1, that desirably has a porch 2 upon which a basket 3 that is to receive the picked cotton, is placed. A skirt or gatherer formed in two sides 6 is provided at the base of the casing for the purpose of laterally gathering the cotton bushes to be within range of the picking mechanism to be described. An apron 7 is mounted at the front of the machine a sufficient distance above the bottom edges of the skirt or gatherer to depress the bushes to a uniform level, and a substantially horizontal grate 8, composed of longitudinally-disposed bars, is continued from the lower margin of the apron 7 rearwardly, so that the level to which the bushes have been depressed may be maintained during the picking operation. A single pair of traction-wheels 9 9 is desirably only employed, upon which the casing is mounted in a manner to be hereinafter set forth.

In order that the casing, together with the grate 8, the picking mechanism, and other associate parts, may be raised and lowered, I preferably employ the mechanism now to be described. The wheels 9 9 are mounted upon a U-shaped axle 10, the U of the axle being inverted. Guides 11 11 are fixed with respect to the side walls 12 12 of the casing. By vertical movement of these guides upon the vertical parts of the U-shaped axle the casing and the mechanism carried thereby are elevated or lowered.

Links 13 are anchored to the casing and terminate at their free ends in hooks that pass through arms 14, that are rigidly secured to a shaft 15, the shaft being journaled in bearings 16, that are mounted upon a cross-girder 17 stationary with respect to the axle. A hand lever 18 is rigidly secured to the shaft 15, desirably at one end of said shaft, this hand lever carrying a locking detent 19, a detent rod 20, and a grip 21, which may be operated to actuate the rod 20 to release the locking detent 19 from the locking quadrant or rack 22, this releasing action being effected against the force of a spring 23 provided normally to hold the detent and quadrant in locking relation. By rotating the lever 18, the links 13 may be elevated and lowered to effect the corresponding elevation or depression of the casing. In order that physical effort may be reduced in raising and lowering the casing, I desirably provide a spring mechanism that exerts a lifting action when the locking detent 19 is disengaged from the quadrant 22. This spring mechanism desirably includes two oppositely wound helices 24 of strong steel rod, which thus constitute coiled springs, one coiled spring terminating in a hook 25 while the companion coiled spring terminates in an eye 26. A tension adjusting rod 27 terminates at one end in an eye, by which said rod is engaged with the hook 25, the other end of the rod 27 having threaded thereupon an adjusting nut, the threaded end of the rod 27 passing through the eye 26, the nut serving to adjust the space between the portions 25 26. The coiled springs are wound about cores 28 that are carried by the girder 17, and each coiled spring has an outwardly extending hook 29 that is connected with a link 20' attached at its lower end to the casing.

It will be seen that when the elements 19 22 are separated, that the casing is carried by the coiled springs 24 by reason of the engagement of the portions 29 of said springs with the links 20', so that the operator, who may remain upon his seat, may have little difficulty in raising or lowering the casing. The extent to which the springs 24 counter-act the weight of the casing is determined by the adjustment effected by the adjusting device 27.

The picking, stripping and cleaning mechanism is operated from a main shaft 30 that is driven by the sprocket-gears 31 located at its outer ends and rotated by the sprocket-chains 32 operated by the sprocket-wheels 33, there being one such sprocket-wheel 33 directly coupled and coaxial with each traction-wheel.

In order that the single shaft 30 may be in driven connection with both traction-wheels and at the same time permit one of the traction-wheels to move faster than the other, as in making turns, the said shaft 30 is made in sections united by a differential gear 34.

A third sprocket-wheel 35 may constitute the frame that carries the gears 36 that form component parts of the gearing 34 in a manner well understood by those skilled in the art, for it is by such an arrangement that said sprocket-wheel 35 may be rotated through the agency of both sections of the shaft 30, whether said sections are rotating at the same or different speeds. The sprocket-wheel 35 drives a sprocket-chain 37, that in turn rotates a sprocket-gear 38, which directly causes the operation of the picking, stripping and cleaning mechanism, as will be described.

As hitherto stated, the sprocket-wheel 38 is the direct cause of the operation of the pickers, strippers and cleaners, the shaft 39 directly operating the picking mechanism, as will be specified, the sprocket-gear 40 upon said shaft 39 operating the sprocket-chain 41, that in turn rotates the sprocket-gear 45 mounted upon a shaft 43, upon which shaft are fixed the strippers 44. Where cleaners are employed, the shaft 43 may have mounted thereon a sprocket-wheel 42, that operates the sprocket-chain 46, which sprocket-chain causes the rotation of a sprocket-wheel 47 fixed upon a shaft 48, upon which shaft are also fixed cleaning elements 49 in the form of wheels, one for each stripping-cylinder slot. The cotton that is picked and cleaned is passed through an opening 50 into the basket below the opening. The apron 50¹ holds the cotton in the path of the packer.

The cotton when it reaches a suitable height in the basket, is packed by the packing spiral 52 which is rotated by a shaft 53 that is flexibly coupled by the flexible joint 54 with a sleeve 55, movable back and forth upon and rotating with a shaft 56, that carries a bevel-gear 57 adapted to mesh with the bevel-gear 58 splined with the driving shaft 30. The shaft 53 works within a sleeve 59 that is anchored and held at 60 60 upon the porch 4, said shaft being longitudinally movable in said sleeve 59 so that the packing spiral may be thrust upward as the cotton within the basket is being packed, the packing spiral thereby automatically accommodating itself to the changing level of the cotton. When sufficient cotton has been packed within the basket, the packing spiral 52 is raised by the gathered cotton to such an extent that the collar 61 fast upon the shaft 53, engages the cam end 62 of the bell clapper 63 to cause the said clapper to strike the gong 64. The operator (the driver) of the machine will then have his attention called to the fact that a basket has been filled, whereupon the filled basket may be removed and a fresh basket substituted.

By providing the sleeve and shaft construction 55 56 and the flexible joint 54, it is obvious that the angular relations of the shafts 56 53 may be changed according to the quantity of cotton contained in the basket, and, in order that the shaft 56 may accommodate itself to this operation, it is provided with a hub extension 65, which is capable of rotation about the shaft 30 as the shaft 56 is raised and lowered.

It will be seen that the packing spiral is operated by the shaft 30, and therefore by the vehicle wheels of the machine.

I do not deem it necessary herein to specifically describe the construction and operation of the picking mechanism, stripping mechanism and the cleaning mechanism, as such mechanism is preferably that disclosed in my aforesaid Patent 798,651, dated Sept. 5, 1905.

Whenever it is desired to stop the operation of the packing mechanism, picking, stripping and cleaning mechanism, I desirably employ a clutch mechanism (illustrated very clearly in Fig. 7). The shaft 30 is provided with splines 66 67, which force the rotation of the clutch collar 68 and the bevel-pinion 58. The clutch collar 68, when in its outermost position, engages a companion clutch element 69 that determines the operation of the mechanism carried by the casing. The bevel-gear 58, when thrust to an outer position, engages the bevel-gear 57, whereby the operation of the packing device may be effected. A spring 70, when not counteracted, maintains the elements 58 68 in their outermost position by exerting a spreading action between said elements. In order that the elements 68 58 may be moved toward each other, I employ two links 71 72 and a handle 73, to which said links are pivoted at different places, said handle, when in the position shown in Fig. 7, drawing the elements 58 68 toward each other against the action of the spring 70. When the handle 73 is reversed in position, as shown in Fig. 1, the spring 70 acts to thrust the elements 58 68 apart for the purpose specified. In order that neither element 58 68 may be moved too far when the handle 73 is being placed in the position shown in Fig. 7, and in order that the disengagement of both of said elements from their companions, may be insured, I provide lugs 74 75 that limit the inward movement of said elements.

As described in my original application 295,100, filed January 8, 1906, I preferably place a coating of oil or other suitable material upon the fingers while they are being bodily moved and also while they are not rotating about their individual axes, to which end I employ an oil receptacle 76 that is mounted upon the inner faces of the side walls of the casing, into which receptacle wicking 81 projects. This wicking is slit in the planes of movement of the picking fingers so that as the picking fingers bodily move, they may pass through the slits, and in passing through, be sufficiently coated with the oil. The object of this arrangement, as stated in my copending original application is to prevent foreign matter from being sufficiently acquired by the picking fingers that would prevent the picking fingers from efficiently picking the cotton.

There are certain features disclosed in my present application that are claimed in my divisional application Serial No. 311592, filed April 13, 1906, this latter application being also a division of my original application Serial No. 295,100, filed January 8, 1906.

From the foregoing description of the accompanying drawings, it will be apparent to those skilled in the art that I have devised a radical departure in the art of cotton picking machines, inasmuch as by means of the machine of my invention the cotton which hitherto returned to the picking mechanism of prior machines, to interfere with the operation of the picking mechanism, is removed from the point of discharge of the picking mechanism, in order to prevent the return of the cotton to the picking mechanism, the packing mechanism of my invention not only serving to thus remove the cotton from the point of discharge where it hitherto accumulated and from which point it was hitherto forced back into the picking mechanism, but also to pack the cotton so that one basket or receptacle may be very well filled with the cotton before it is removed and replaced, thereby better adapting the machine to its purpose.

I operate the packing mechanism by the running gear of the cotton harvester which also operates the picking mechanism, so that there is a definite ratio of operation of the picking and packing mechanisms, whereby the faster the cotton is placed by the picking mechanism at the point of discharge, the faster it is removed, so that the picking mechanism cannot place the cotton at a point of discharge faster than the packing mechanism can take the cotton away from such point of discharge. If the running gear did not operate both the picking and packing mechanisms, it is very conceivable that great care must be taken to preserve the proper ratios of speed of the picking and packing mechanisms, the necessity of which care is obviated by causing the picking and packing mechanisms to be operated by the same running gear. As a matter of fact, no mechanism is conceivable which would maintain the proper ratios of the speed of operation of the packing and picking mechanisms other than the running gear when employed to operate both such mechanisms.

While I have herein shown and described the preferred embodiment of my invention, I do not wish to be limited to the precise construction shown, as changes may readily be made therein without departing from the spirit of the invention, but,

Having thus described my invention, I claim as new and desire to secure by Letters-Patent:

1. A cotton harvesting machine including picking mechanism operated by the running gear of the machine, a receptacle, mechanism for transferring the picked cotton to said receptacle, and a packing spiral for packing the cotton into the receptacle, the packing spiral serving both to remove the cotton to prevent its return to the picking mechanism and thereafter to compress the cotton.

2. A cotton harvesting machine including picking mechanism, a receptacle, mechanism for transferring the picked cotton to said receptacle, and a packing spiral for packing the cotton into the receptacle, the packing spiral serving both to remove the cotton to prevent its return to the picking mechanism and thereafter to compress the cotton.

3. A cotton harvesting machine including picking mechanism, a receptacle, mechanism for transferring the picked cotton to said receptacle, a packing spiral for packing the cotton into the receptacle, and mechanism whereby said packing spiral is operated by the running gear of the machine, the packing spiral serving both to remove the cotton to prevent its return to the picking mechanism and thereafter to compress the cotton.

In witness whereof, I hereunto subscribe my name this 13th day of March A. D., 1906.

JOHN F. APPLEBY.

Witnesses:
G. L. CRAGG,
WALDO B. STONE.